(12) United States Patent
Clark

(10) Patent No.: US 10,019,146 B2
(45) Date of Patent: Jul. 10, 2018

(54) SNAP POINTS INCLUDING RANGES

(71) Applicant: Home Box Office, Inc., New York, NY (US)

(72) Inventor: Brendan Joseph Clark, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 359 days.

(21) Appl. No.: 14/841,642

(22) Filed: Aug. 31, 2015

(65) Prior Publication Data

US 2016/0070429 A1 Mar. 10, 2016

Related U.S. Application Data

(60) Provisional application No. 62/046,138, filed on Sep. 4, 2014.

(51) Int. Cl.
*G06F 3/048* (2013.01)
*G06F 3/0485* (2013.01)
*G06F 3/0481* (2013.01)
*G06F 3/0482* (2013.01)
*G06F 3/0483* (2013.01)

(52) U.S. Cl.
CPC .......... *G06F 3/0485* (2013.01); *G06F 3/0481* (2013.01); *G06F 3/0482* (2013.01); *G06F 3/0483* (2013.01)

(58) Field of Classification Search
CPC .......................... G06F 17/217; G06F 3/04855
See application file for complete search history.

(56) References Cited

U.S. PATENT DOCUMENTS

| 8,402,385 | B1* | 3/2013 | Clark | G06F 3/04855 715/784 |
| 8,661,363 | B2* | 2/2014 | Platzer | G06F 3/04845 345/169 |
| 2010/0306704 | A1* | 12/2010 | Cotterill | G06F 3/04847 715/833 |
| 2012/0174005 | A1* | 7/2012 | Deutsch | G06F 3/04817 715/764 |
| 2012/0272181 | A1* | 10/2012 | Rogers | G06F 3/0482 715/784 |
| 2013/0106914 | A1 | 5/2013 | Jain et al. | |

(Continued)

FOREIGN PATENT DOCUMENTS

EP 2453666 5/2012

OTHER PUBLICATIONS

International Search Report and Written opinion from International Patent Application Serial No. PCT/US2015/047920, dated Nov. 4, 2015, 14 pages.

*Primary Examiner* — Mahelet Shiberou
(74) *Attorney, Agent, or Firm* — Amin, Turocy & Watson, LLP

(57) ABSTRACT

The described technology is directed towards scrollable user interface containers, and allows mixing snap items and smooth items in the same container. Snap point ranges that correspond to container snap items are specified, such as by pixel values or per container item to be rendered. When because of a scroll operation a snap item of the container overlaps a boundary of a viewing port (e.g., if rendered), the scroll position is adjusted based upon a snap point range limit to snap the snap item for rendering based upon the viewing port boundary.

20 Claims, 12 Drawing Sheets

(56) References Cited

U.S. PATENT DOCUMENTS

| | | | |
|---|---|---|---|
| 2013/0111396 A1* | 5/2013 | Brid | G06F 3/0485 |
| | | | 715/784 |
| 2014/0040747 A1* | 2/2014 | Gardenfors | G06F 17/30064 |
| | | | 715/728 |
| 2014/0258854 A1* | 9/2014 | Li | G06F 3/0484 |
| | | | 715/702 |
| 2015/0286357 A1* | 10/2015 | Penha | G06F 3/0485 |
| | | | 715/830 |
| 2015/0350735 A1* | 12/2015 | Koser | H04N 21/435 |
| | | | 725/37 |

* cited by examiner

SNAP POINTS INCLUDING RANGES

CROSS-REFERENCE TO RELATED APPLICATION

The present application claims priority to U.S. provisional patent application Ser. No. 62/046,138, filed Sep. 4, 2014, the entirety of which is incorporated herein by reference.

BACKGROUND

When interacting with a computer program, a user often needs to scroll new content items into view, such as text, images, and interactive icons comprising user interface (UI) elements. A scrollable user interface (UI) container is one that contains content that is too large to display at once, and scrolling is the operation that moves a subset of that content into view.

There are two common kinds of scrollable UI containers—continuous content, like a map, or ones that contain discrete items, like a list of text or image items. In the continuous content case, the user is typically able to pan around the content to any position they like. With discrete items, it is sometimes preferable for the user to only be able to scroll to fixed positions where discrete items are completely kept on-screen, e.g., an entire image or entire page of text, which, for example, may make for a better viewing experience, or may be needed for legal or other reasons.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards mixing snap items and smooth items in the same user interface (UI) container. In one aspect, this is accomplished by specifying snap point ranges that correspond to container snap items. When a scrolling operation causes or will cause (e.g., because of inertial scrolling) a boundary of a viewing port in which the container is to be rendered to overlap a snap point range, (e.g., a snap item would, if rendered from the current scroll position, span a viewing port boundary), the scroll position is adjusted based upon a snap point range limit to snap the snap item for rendering based upon the adjusted scroll position.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
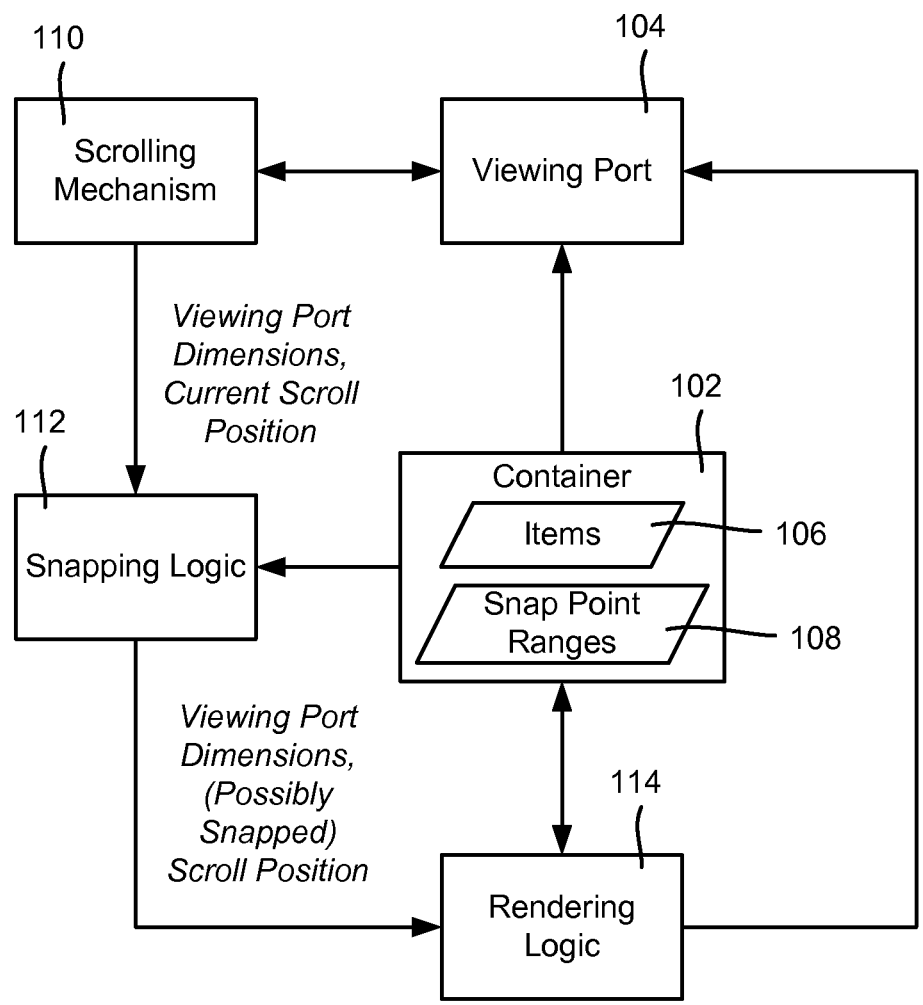
FIG. 1 is a block diagram showing example components that may be configured to render container user interface (UI) items based upon snap point ranges, according to one or more example implementations.

Described herein is a technology by which one or more continuous content items and one or more discrete content items may be presented to a user in a single container. To this end, a program developer can specify snap points, including ranges, by which scrolling is controllable to place a content item onto a screen in the desired manner. By way of a simplified example, a scrollable UI container may contain two content items (e.g., UI elements), one of which the user can pan left or right by scrolling to any position, such as a map, and the other to which the user can only scroll to a particular location, such as to present a full page of a text item or full image tile.

In general, a conventional snap point is a particular location in the scrollable region to which a discrete item can be scrolled. Commonly, these points are set at the boundaries between items. Such points are restrictive—if a scrollable container has snap points, it does not allow the user to scroll to any other position; (e.g., in between two snap points such as half a book page, the user sees either the current page or the next page in its entirety). This is how one desired interaction is implemented, where the user cannot partially scroll an item into view.

One problem with conventional snap point technology is that the design of a scrolling UI container is limited between continuous or discrete modes. In the continuous mode, the user gets continuous panning, which can leave some featured content only partly on-screen and partly obscured, which may be undesirable in many situations. In the discrete mode, the user gets snap points, which limit the number of positions to which the user can scroll, which again may be undesirable in many situations, such as with a map. For example, in the discrete mode, there are a limited number of positions, which can cause undesired snapping behavior in regions where some items are huge (e.g., a map) or some items are small.

By using snap points including ranges as described herein, a developer may specify that a UI container have a mix of these two behaviors. By way of example, consider a scrollable UI container with items of many different scales. Some content items may be rendered so as to be completely visible (or not rendered unless completely visible), while other content items can be continuously panned through so that they may be partially visible (at times when not wholly visible). Using the above example, sometimes the developer may want a user to 'page' through content, like a book, while other times the developer may want a user to 'pan' through content, like a map. Snap points including ranges allows the developer to mix both kinds of content in the same UI container.

It should be understood that any of the examples herein are non-limiting. As one example, although a container may be a defined user interface (UI) element, the technology may apply to any other type of "container" including an entire display screen, a window, a menu and so forth. As another example, primarily exemplified herein is scrolling left or right in a horizontal direction, however the technology applies to up or down vertical scrolling, diagonal scrolling and even to three-dimensional concepts such as zoom. As yet another example, some input can cause a system to programmatically scroll (such as a button press that moves forward by one full screen amount); the snap point technology described herein applies to this kind of scrolling as well as other types of scrolling, such as user interaction with cursor keys, a scroll bar and so on. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and managing UI content in general.

FIG. 1 shows example components of a system that uses snap point ranges to determine item rendering. In general, a container 102 is rendered in a viewing port 104. If the container 102 is wider than the viewing port 104 and/or taller than the viewing port 104, then the container 102 becomes scrollable in the appropriate horizontal and/or vertical direction so as to continue to fit in the viewing port's space.

The container contains items 106 and in this example a set of one or more snap point ranges. The items are typically but not necessarily rectangles, and the items may be arranged to be rendered in a column, a row, or a grid, for example. There may be a horizontal subset of horizontal snap point ranges, and/or a vertical subset of horizontal snap point ranges. In general, the items 106 that are "snap" items correspond to one of the snap point ranges, e.g., one horizontal range if horizontal scrolling is possible, and one vertical range if vertical scrolling is possible. Note that it is possible for an item to be snapped vertically but not horizontally, or horizontally but not vertically.

As is known, a scrolling mechanism 110 allows a user (or program command or the like) to interact with the container to perform scrolling. As also described herein, snapping logic 112 uses the snap point ranges 108 to possibly modify the point (or points) to which the container was scrolled within the viewing port's boundaries, that is, snaps the scroll position (X and/or Y point) so that a snap item in the container aligns with the viewing port's boundary (or boundaries). Rendering logic 114 then renders the items based upon the (possibly snapped) scroll position.

As can be readily appreciated, many of the components represented in FIG. 1 may be encapsulated into objects. For example, a container object may contain the scrolling logic and (at least some) of the rendering logic, and the items can contain (at least some) of the rendering logic. The snapping logic may be built into the scrolling mechanism, or otherwise coupled thereto, e.g., as a callable object. Indeed, any of the components described or even suggested herein may be divided into more components, or combined into a lesser number of components.

Figure 2:
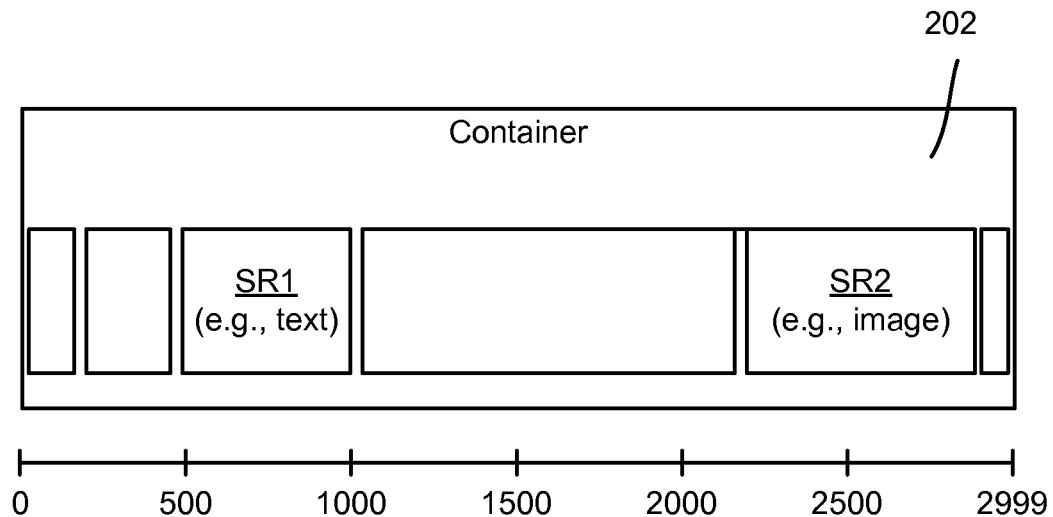
FIG. 2 is a representation of a container including snap items based upon associated snap point ranges, according to one or more example implementations.
Figure 2:
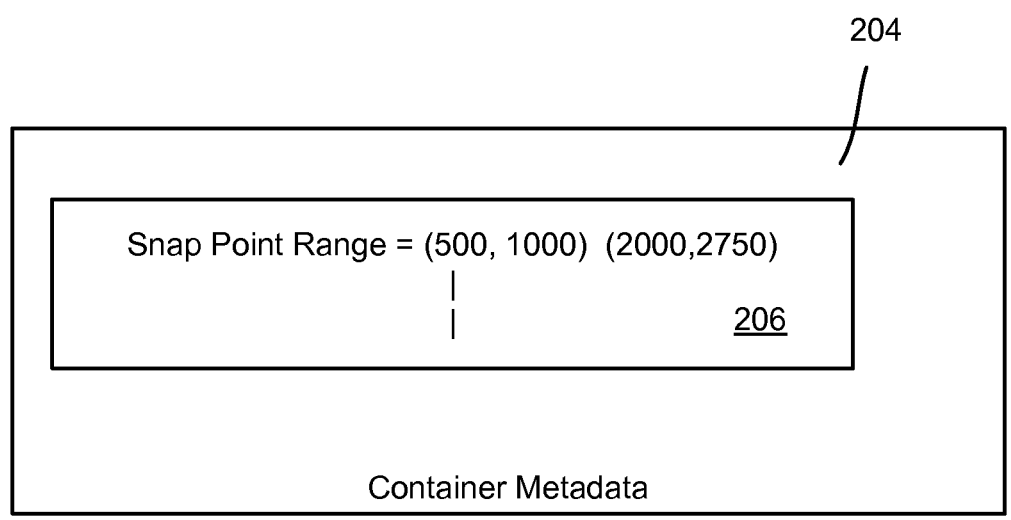

As generally represented in FIG. 2, in addition having an association with the items to render, a container 202 is thus associated with container metadata 204 or the like. The container metadata 204 may define inclusive ranges of snap points for the container 202. The container 202 may be associated with the container metadata 204 in any number of ways, such as by being properties of a container object, by being properties of a container items, by being based upon the dimensions of any container snap items, by having a pointer or other reference to the container metadata 204, and so on.

In the example of FIG. 2, the container 202 is shown having a mix of scrolling behaviors by including snap point ranges 206 in the container metadata 204. This example has two snap point ranges defined, such that content items within the container ranging from (500, 1000) and (2000, 2750), shown as SR1 and SR2 respectively, are snap items. Smooth panning exists outside these ranges, e.g., from 0 to 499, 1001 to 1999, and 2751 to 2999 (although scrolling right is typically only allowed up until to the right limit of the viewing port matches the right limit of the container).

Note that although (e.g., inclusive) ranges of snap points may be used as described herein, it is understood that smooth scroll ranges may be similarly or alternatively defined. In other words, an alternative implementation may define the ranges of the smooth 'pan-anywhere' behavior. Thus, instead of snap point ranges, smooth scroll ranges of (0, 499) (1001, 1999) and (2751, 2999) may accomplish the same result. Indeed, in a container with many snap point ranges and few smooth ranges, it may be more efficient for a developer to specify only the few smooth ranges. Thus, a snap point range may be explicitly defined, or may be implicitly defined by not being within any defined smooth point range(s), depending on a given implementation.

Further, note that the snap point ranges herein may be in terms of any suitable unit, such as pixels, and thus a range may be as small as two pixels. However, a developer or program may use any mechanism it wants for snap point ranges. For example, a container object with child elements may have one or more child elements specified as "snap" items and other child elements be specified as "smooth" items (or simply not specified as snap items), in which event each item effectively serves as a snap or smooth unit; (note that space between items also may be a unit). When a container object sets up which child elements to render and where, the container object can automatically adjust the scroll position so that when appropriate, a snap item is rendered at a left or right viewing boundary. Note that this may be based upon child type within the container logic, e.g., text type elements and the like may snap whereas "smooth" type elements such as a map may not snap, as determined by the container logic for each type. Any other suitable criterion or criteria also may be used to decide whether or not to snap, (and if so, how), e.g., a child object's visual "style" properties such as color, width, animation, and so on as decided by a parent object. A child element can also communicate a preference to a parent, e.g., a child also may be a sub-container of the parent and specify that the child container be snapped or not based upon a further child's current position or the like in the lower parent container.

Figure 3:
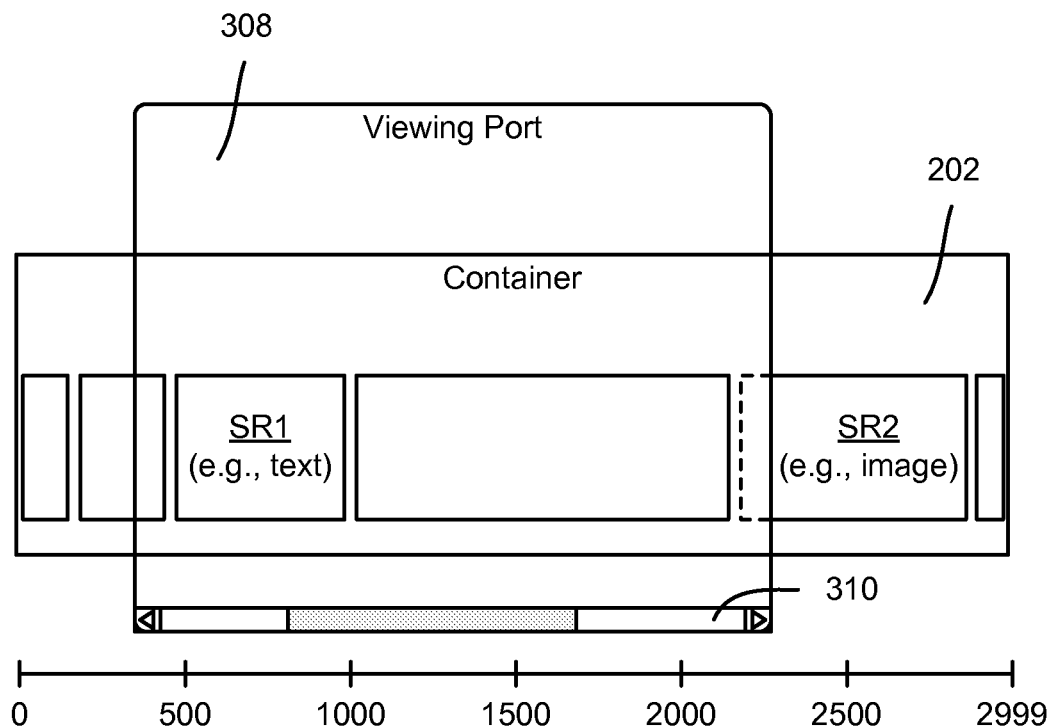
FIGS. 3-5 are representations of container items being rendered in a viewing port based upon different scrolling positions, including snapping behavior (FIGS. 4 and 5) based upon associated snap point ranges, according to one or more example implementations.
Figure 3:
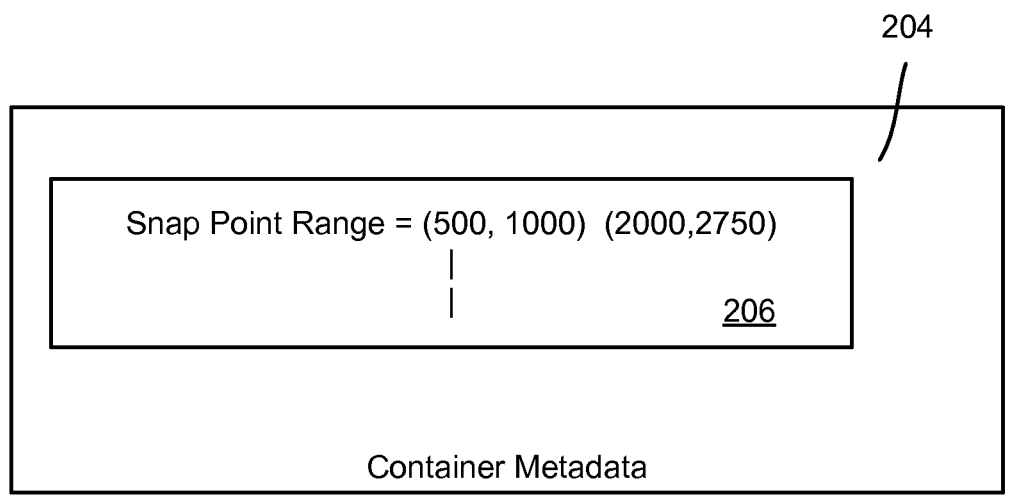

FIG. 3 shows an example view in which the user has scrolled right into the container's items. To illustrate this, FIG. 3 includes a viewing port 308, which may comprise the entire display screen or some smaller portion thereof, e.g., a window or a menu. As is typical, in this example the user may use appropriate input (such as cursor keys, touch, pointing device input, a button and so on) to scroll container items into and out of the viewing port 308. A scrollbar 310, which may be interactive, exemplifies what portion of the container is currently in the viewing port 308; (note that this is only for illustration, and is not intended to be exact).

As the user (or programmatic scrolling) scrolls left or right, different container items scroll into and out of the viewing port 308. The leftmost and rightmost units (e.g., pixels in this example) are known to the container 102, e.g., the current scroll position (e.g., left scroll point) is the offset within the range of 0 to 2999 (actually 2999 minus the viewing port's current width) that maps to the first pixel available to the container for rendering, e.g., left viewing port's left boundary in this horizontal example. Thus, in the example of FIG. 3, the container knows that the left offset is currently equal to 350 and the viewing width is 1920; (note that the exact values are known to the container, but in this example the above values may not exactly match the drawings, as the drawings are only approximate for purposes of illustration).

As can be seen in FIG. 3, at the left offset of 350 the user has not scrolled into a snap point range, and thus smooth scrolling is allowed whereby the item to the left of item SR1 is appropriately cropped and thus partially rendered, along with items SR1 and an item to the right of item SR1. However, element SR2, which corresponds to a snap point range, does not fit entirely in the view, (and for reasons discussed below, was not yet snapped to in this example). In one or more implementations, partial rendering of an item corresponding to a snap point range is not allowed, so the item SR2 is not rendered, even in part (as represented by the dashed lines in the viewing port showing where partially rendering would occur if allowed). However, in alternative implementations, it is feasible have an item defined that is snapped to when scrolled into a snap point range, yet also be partially rendered when not snapped to.

Figure 4:
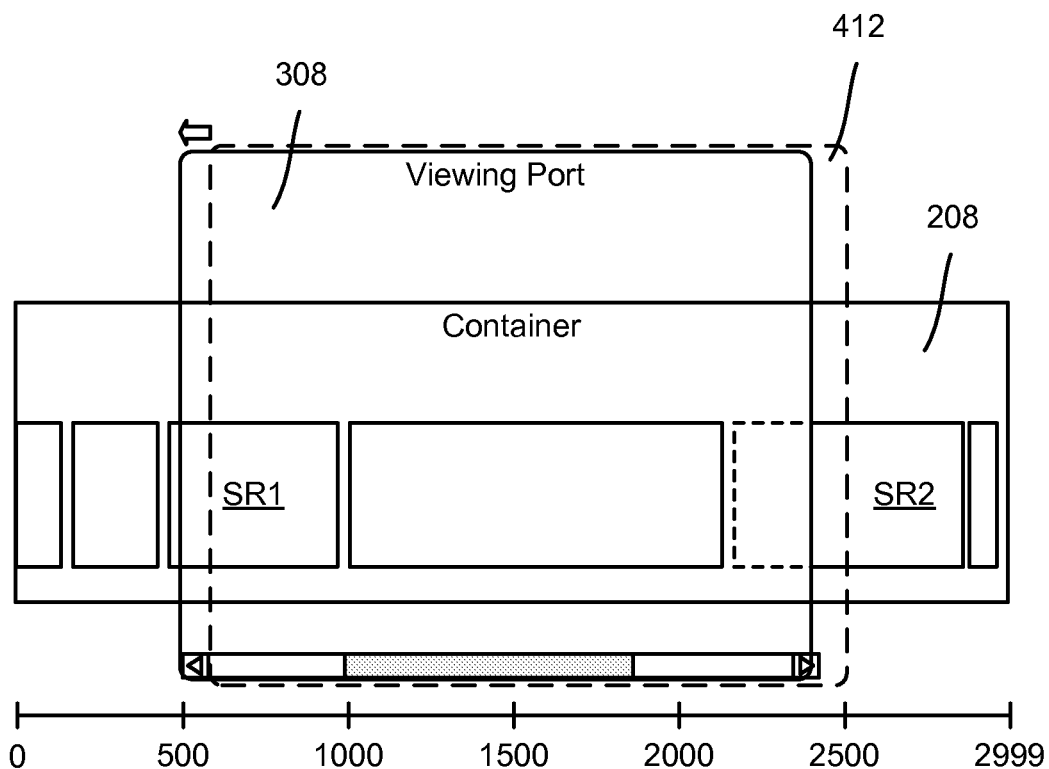
Figure 4:
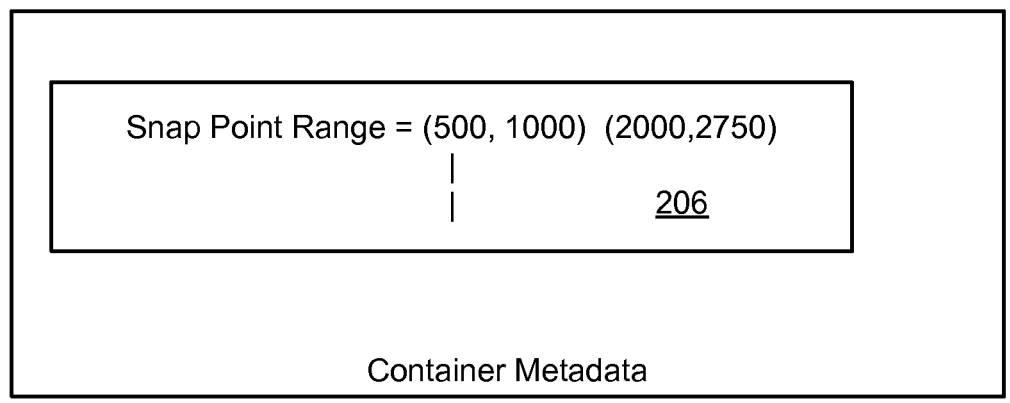

In the example of FIG. 4, the user has attempted to scroll beyond the start of item SR1, as indicated by the dashed box 412 (slightly enlarged in the vertical direction for clarity). However, because the user has scrolled into a snap point range (between 500 and 1000), the system snaps the user back to show all of item SR1, e.g., the left offset is changed to 500 before rendering.

Figure 5:
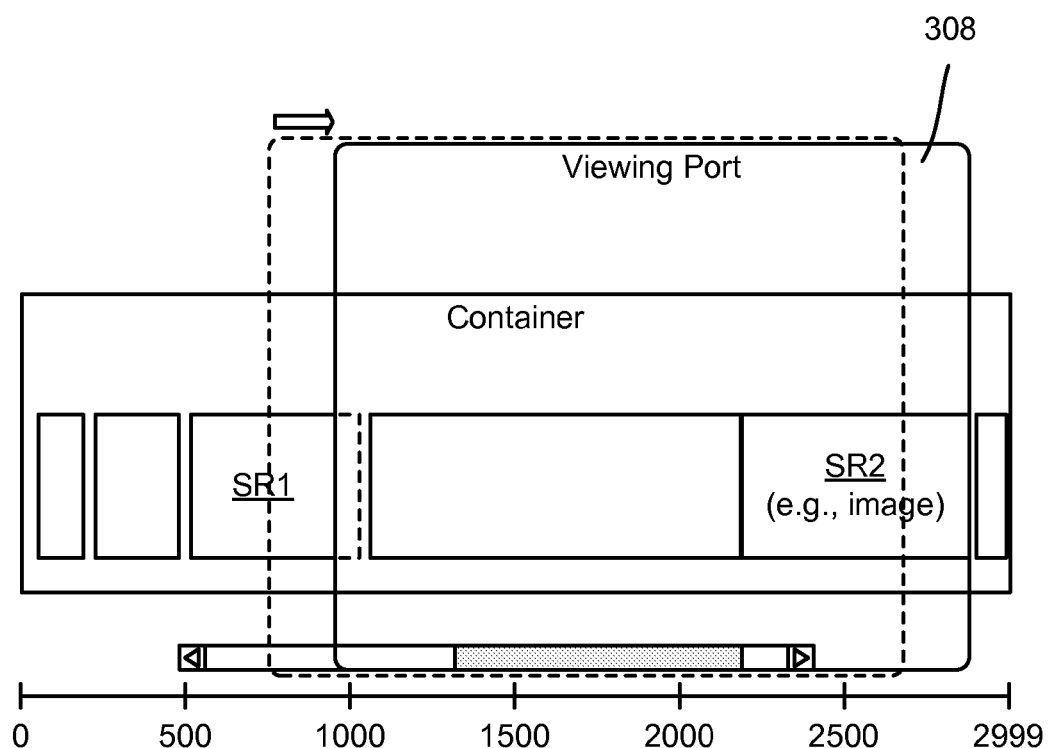
Figure 5:
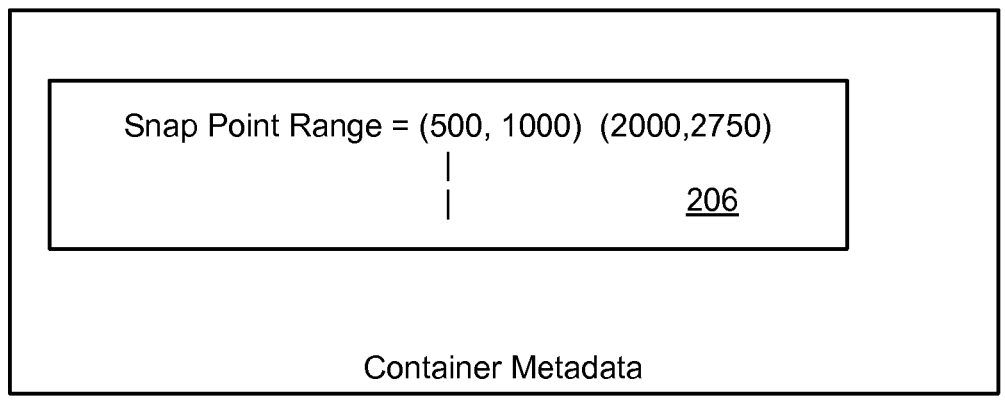

In the example of FIG. 5, the user has scrolled further to the right. In FIG. 5, the user appears to want to see more of the container item or items to the right, and thus is likely not interested in viewing item SR1 any longer. However, the right viewing boundary is in a snap point range corresponding to item SR2. In this example, the system thus snaps the viewing port to the right to show all of item SR2, (e.g., changes the left offset to 2,750 minus the viewing port width) so that all of SR2 fits within the viewing port. The system also removes item SR1 from view, since item SR1 would only partially render.

There is thus described herein a technology to allow a mix of scrolling behaviors within a single container. In this example, container metadata defines inclusive ranges of snap points, and the mixed-behavior scrolling UI container accepts multiple ranges. If scrolling takes place inside a range of snap points, the user gets the snapped behavior. If scrolling takes place between ranges of snap points, the user gets the smooth 'pan-anywhere' behavior.

Figure 6:
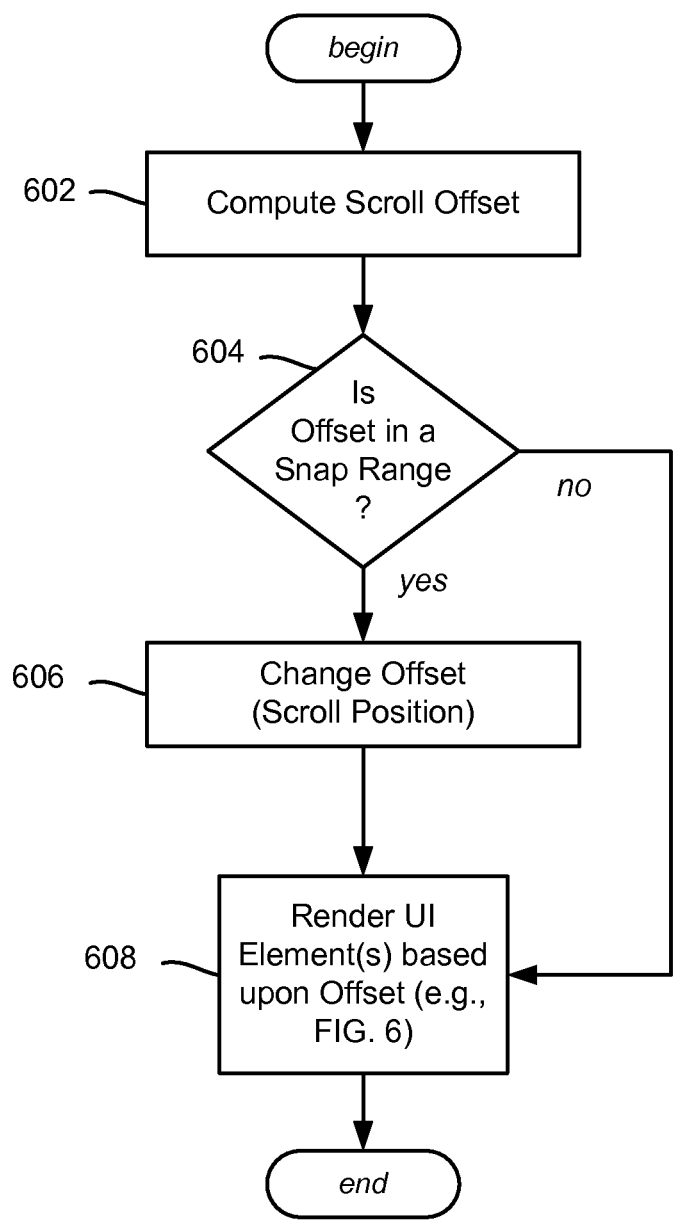
FIG. 6 is a flow diagram including example steps generally directed towards snapping a snap item or not snapping smooth items, according to one or more example implementations.

FIG. 6 shows general example logic for snapping to a range or allowing smooth behavior when scrolling. In FIG. 6, step 602 computes the scroll offset.

Figure 7:
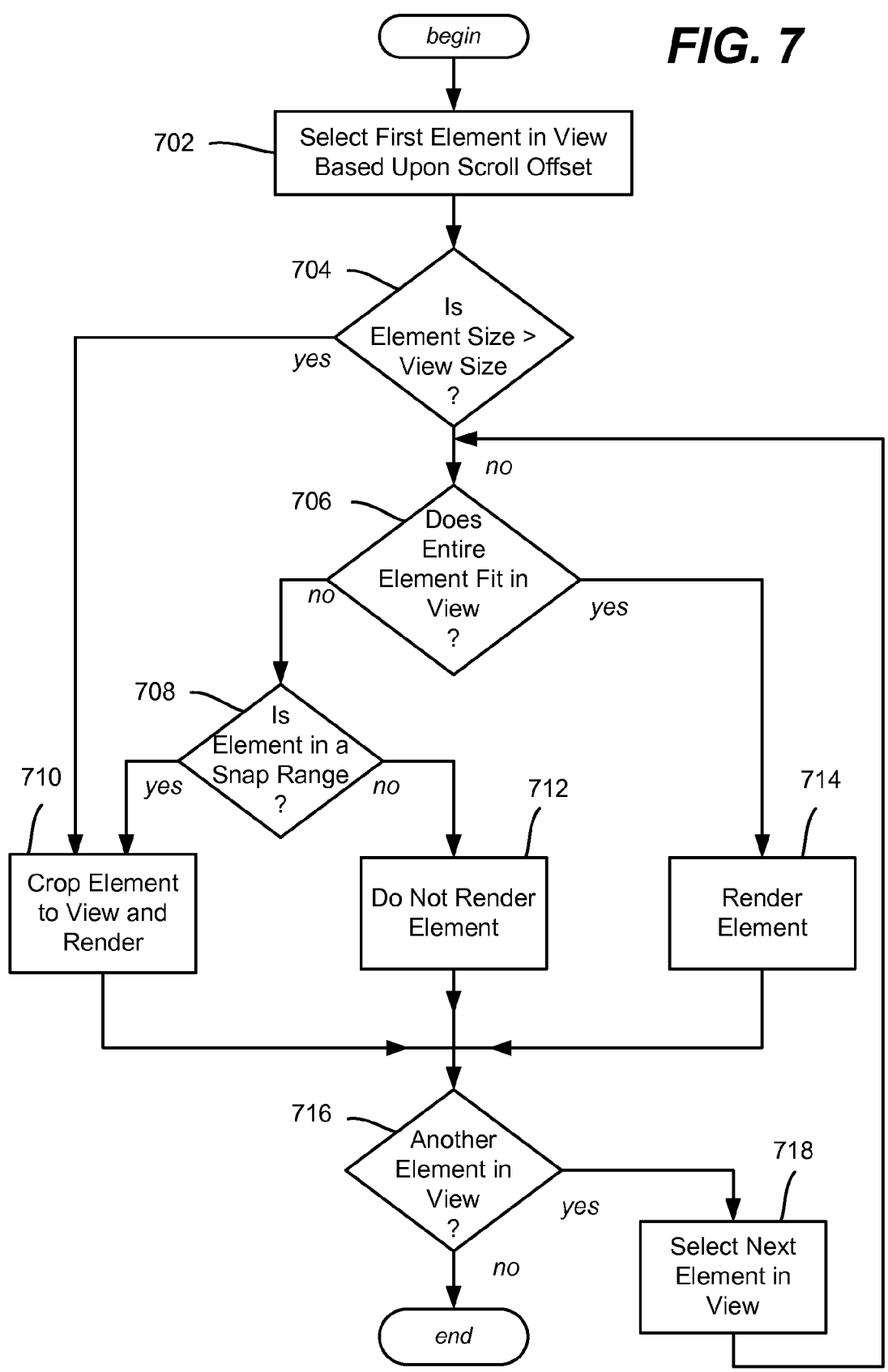
FIG. 7 is a flow diagram including example steps generally directed towards rendering items including snap items and smooth items, according to one or more example implementations.

If the offset is in a snap range (step 604), then the offset is changed at step 606 based upon one of the snap range values, otherwise the offset is left as is. Step 608 renders the UI elements, such as using the logic described below with reference to FIG. 7. Note that the example logic of FIG. 6 only considered the left scroll offset; notwithstanding, as with FIG. 5 the right viewing port boundary also may be considered and used to change the offset, as described with reference to the example flow diagrams of FIGS. 8 and 9.

With respect to rendering, step 602 of FIG. 6 represents selecting the first item that is in view based upon the scroll offset. Step 604 checks for a possible condition in which the item size is greater than the viewing port's size. If so, then the item needs to be partially rendered, regardless of the snap point range, otherwise the user is not able to see the entire item. (Note that it is alternatively feasible to snap such a large item in smaller subsections by logically dividing the item into two or more subsections with a corresponding snap point range for each subsection. Further note that a container may dynamically divide a large item and redefine snap point ranges as needed, e.g., if the viewport becomes too narrow for a snap item with respect to horizontal scrolling and/or too short with respect to vertical scrolling.)

For an item that does not take up or exceed the whole viewing port, step 606 determines whether the entire item will fit in the view. If so, the element is rendered at step 614, and the next item selected via steps 616 and 618 until no items remain that are able to fit in the view.

Whether or not an item that does not fully fit in the view is rendered in part or not rendered at all (in this example implementation) depends on whether the item corresponds to a snap point range. If the item is not a snap item and may be partially rendered, step 608 determines this, and step 610 crops the item to fit in the viewing area, e.g., (for horizontal scrolling) crops from the left of the partial item for the first item, or crops from the right of the partial item for the last item. Steps 616 and 618 repeat item evaluation and possible rendering until no items remain that are able to fit in the view.

If the item does not fully fit and corresponds to a snap point range, then this snap item is not rendered (step 612) because otherwise such an item would only be partially rendered, which is not allowed in this particular example.

Whether or not a snap item is actually snapped to may depend on a number of factors, including the scroll direction and the viewing port boundary position relative to the range overlap/item position; (some other factors are set forth below). In the examples of FIGS. 2-5, if the user is scrolling right, then at some point the user's actions suggest that the user wants to see more of the item or items to the right of item SR1. Thus, it is not logical to always adjust the offset scroll position left to snap back left to item SR1 when the left offset is in the snap point range for item SR1. Indeed, if the user is scrolling right, then at some point it makes sense to snap to render the item SR2; however if only a small portion of item SR2 would be visible (if allowed to be rendered in part), then it may not yet be appropriate to snap to item SR2 so that all of item SR2 is rendered within the view. Similar decisions may be made for scrolling left.

As can be seen, whether to snap to a snap point or not attempts to interpret user intent, and is thus a question that may be decided in a number of ways, including snap item/boundary overlap amount and the scroll direction. One straightforward way is to use the midpoint of a snap point range (item) to make the decision, e.g., if the user is moving in a direction such that a viewing boundary overlaps a range such that more than half the item would render (assuming partial rendering was allowed), then snap further in that direction to render the whole item. If not beyond the midpoint in that direction, then do not snap to that range/item.

It is possible that the other (e.g., right) viewing port boundary may determine snapping, such as based upon another snap item spanning that boundary. In other words, it is possible for two snap point items to be candidates for snapping. Indeed, in the examples of FIGS. 4 and 5, either item SR1 or SR2 may be snapped, as each snap item spans one of the viewing port's boundaries, (before snapping, that is). In such a situation, the scrolling direction may help make the decision, e.g., if scrolling left, snap to SR1; if scrolling right, snap to SR2.

However, this scrolling left versus right solution does not consider how much of each element is overlapping the viewing window, (that is, after user scrolling ends but before any snap adjustments). For example, in FIG. 4, if the user scrolled to the right just beyond SR1's left snap point range value, e.g., to an offset of 520, snapping back to the left seems more sensible then snapping right to item SR2 because the user scrolled only a small amount past the start of the range yet a relatively large snap may occur that removes item SR1 from view. Conversely, in FIG. 5, the scroll to the right seems sufficiently far to snap to the right so that item SR2 is fully in view instead of item SR1.

Figure 8:
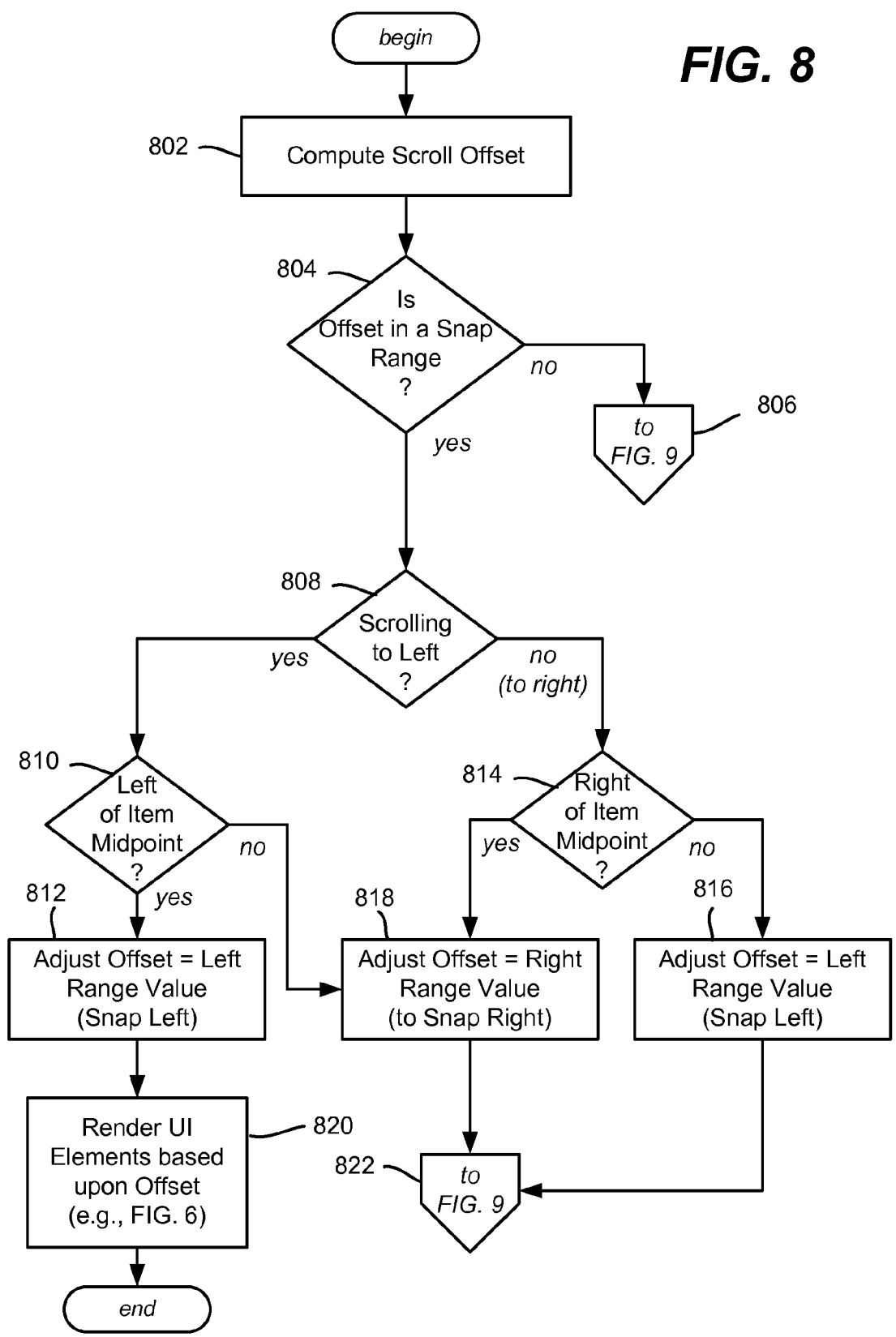
FIGS. 8 and 9 comprise a flow diagram showing example steps that may be taken to determine whether to snap to an adjusted scroll position based upon snap item(s), according to one or more example implementations.
Figure 9:
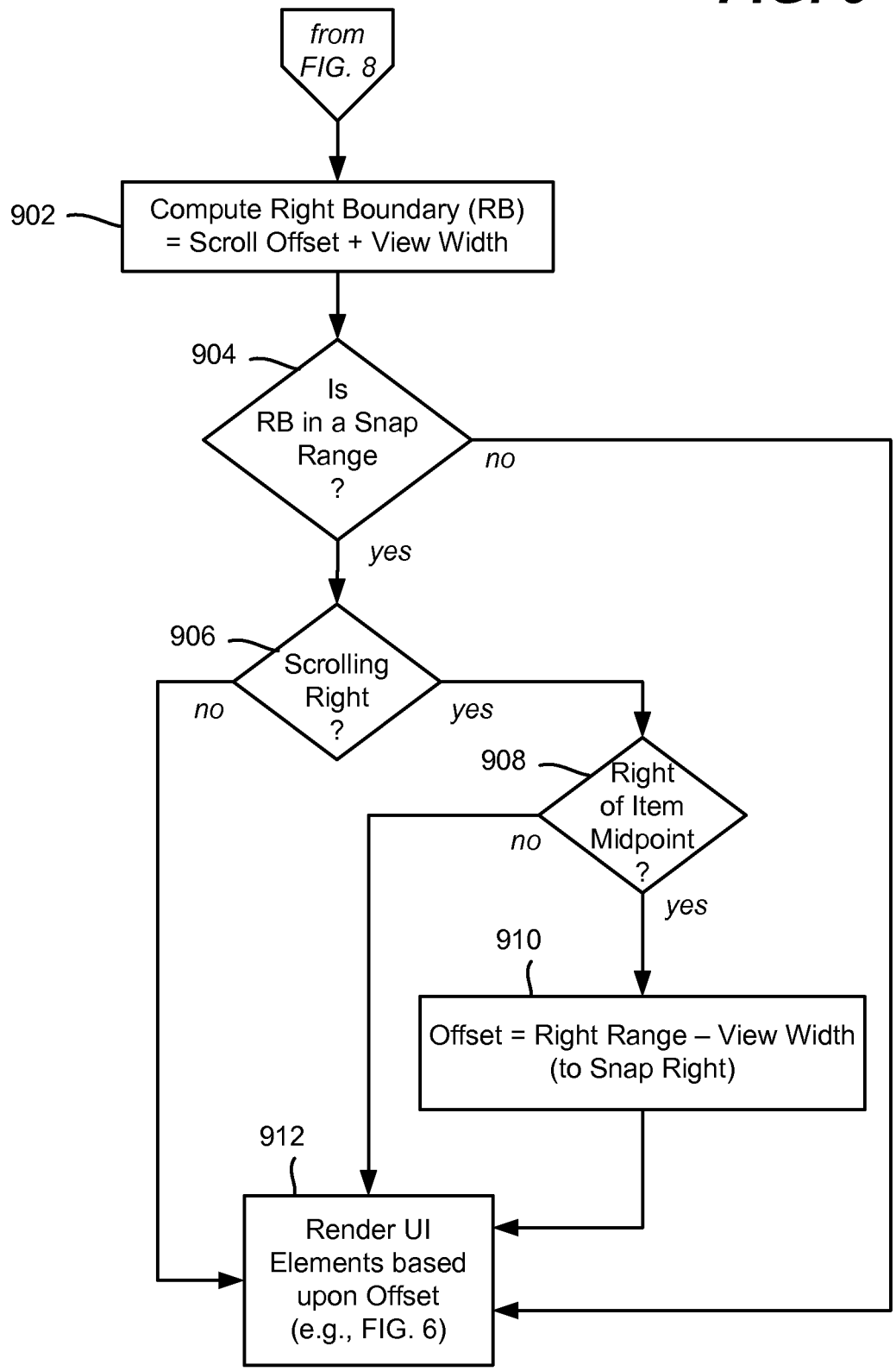

FIGS. 8 and 9 show example logic that may be used to make a directional plus threshold (e.g., midpoint) snapping decision. In general, if snapping applies because the offset is in a snap point range, FIG. 8 snaps a snap item to the left by moving the offset to the lower range value if a) the user is scrolling left and b) the offset is less than of the item snapping threshold (e.g., the range midpoint). If left snapping does not apply, then the right boundary of the viewing port is checked in FIG. 9 to see if the right boundary is in a snap range. If a) the offset is not in a snap range or is in a snap range but is not less than the snapping threshold after scrolling left, or b) after scrolling right the offset is in a snap range but is greater than (or equal to) the snapping threshold, then the offset may be snapped to the right, and further, the right boundary of the viewing port is checked in FIG. 9 to see if the right boundary is in a snap range, which may further impact snapping. Note that if scrolling right but not far enough to snap to the right range value of a snap item, then scrolling right may still occur; this is only one possible way to handle such a situation. Note that in this example implementation, a snap item is not partially rendered in any event, because of the rendering logic of FIG. 7.

FIG. 8 shows example logic directed towards directional and overlap amount-determined snapping, beginning at step 802 where the scroll offset into the container is computed when scrolling ends. Note that where scrolling ends may include scrolling inertia, as described below.

Step 804 evaluates whether the scroll offset is in a snap point range. If not, step 804 branches to step 806 to determine whether the right boundary of the viewing port is in a snap range, which also may result in a snapping action (as described with reference to FIG. 9).

If the offset is in a snap range, then snapping may occur depending on the scroll direction (step 808) and how far into the item the user has scrolled (step 810 or step 814). For example, if the scroll was to the left at step 808 and the scroll was beyond (left of) the range midpoint at step 810, then a snap left is appropriate at step 812 to render the items at step 820 based upon the left range starting point becoming the offset, e.g., using the rendering logic of FIG. 7.

If scrolling left at step 808, but the item (range) midpoint was not reached, a snap back right at step 816 is deemed appropriate in this example.

If scrolling right at step 808 but the item (range) midpoint was not reached, a snap back left at step 816 is deemed appropriate in this example, which corresponds to the condition exemplified in FIG. 4; (however, rendering does not yet occur because the right boundary is first checked for right snapping, as described below with reference to FIG. 8.) Similarly, if scrolling right at step 808 and the offset is past the midpoint of the range (step 814), a snap right of the offset to the right range limit is appropriate at step 818.

When not snapped left at step 812 and rendered at step 820, step 822 represented by the logic of FIG. 9 may be applied to determine if the right boundary of the viewing port is in a snap range, whereby further adjustment may be appropriate to snap another item into the viewing area. In other words, before rendering unless from a certain snap left offset adjustment (steps 804, 808 and 810 were met), the example steps of FIG. 9 may be performed to determine if a snap item is in the right boundary of the viewing area, which may result in a snap right.

FIG. 9, step 902 computes the right boundary of the viewing area as the offset plus the viewing port width; (the offset was possibly adjusted from FIG. 8). If the right boundary is not in a snap range as evaluated at step 804, then no further adjustment to the offset is needed and the items may be rendered from the offset such as via the rendering logic of FIG. 7. Note that the snap range at this point (2000, 2750) is different from the snap range used in FIG. 8 (500, 1000) because the snap range (2000, 2750) is the one overlapped by the boundary that is at issue.

If at step 904 the right boundary is in a snap range, then the corresponding item of that range may be snapped to fit into the viewing area. If the scroll direction was to the right (step 906) and the item midpoint was reached at step 808 (including after any snap adjustment in FIG. 8), then the offset is snapped right at step 910 to fit the item its entirety into the viewing port. Otherwise the item is not partially rendered because of the rendering logic of FIG. 7. Step 912 represents performing the appropriate rendering.

Instead of using the direction and item midpoint as a determining factor, it is feasible for a developer to use a different threshold value or set of values, such as a scrolling right threshold value, and a scrolling left threshold value. Thus, the metadata for one range may contain a (left range value, left threshold value, right range threshold value, right range value) for example. It is alternatively feasible for a developer to set a weight (e.g., a percentage value or values) that are different from the midpoint weight (a fifty percent value), possibly using the same percentage for all ranges, or specifying a percentage or percentages per range. As another feasible alternative, consider that different thresholds/percentages may be based upon the scrolling speed, e.g., (left range value, left threshold value for a slow scroll, left threshold value for a medium scroll, left threshold value for a fast scroll, right range value, right threshold value for a slow scroll, right threshold value for a medium scroll, right threshold value for a fast scroll).

To this end, any of the steps of FIG. 8 or 9 that evaluate a "midpoint" may instead be substituted with a corresponding threshold value (or computed from a percentage) set by the developer, and each value may be different depending on scroll direction and/or scroll speed (and possibly other factors, set forth below). For example, step 810 may instead evaluate whether the scroll is to the left of the left threshold value, step 814 may instead evaluate whether the scroll is to the left of the right threshold value so that relatively slightly scrolling left into the item results in a full snap left. Step 908 may use the left threshold value for the same purpose, and any range may have a different set of threshold values. Each of these values may be computed from a percentage, and/or selected based upon scrolling speed.

Further, the amount of user scroll may be a factor, e.g., if the user only scrolled ten pixels in one direction, do not snap more than thirty (or forty or some other suitable configurable number) pixels in that direction. The scroll starting point and/or any prior snapping also may be considered, e.g., if the user is starting from a left range limit (e.g., pixel offset of 500 corresponding to the start of item SR1 in FIGS. 2-5), possibly because of snapping, then any scroll to the right may indicate that the user is no longer interested in viewing item SR1, as SR1 was snapped into full view yet the user decided to scroll further right. Any or all of these factors, as well as others such as the prior history of user behavior, type of device, type of scrolling (touch or pointer) may be used as a factor in making the snapping or no snapping decision for any boundary (horizontal X or vertical Y, or even Z coordinates).

Indeed, although snap point ranges have been described in an X-coordinate direction, snap point ranges work in the Y-coordinate direction as well, e.g., using the same general logic. Note that diagonal scrolling includes a horizontal component and a vertical component, whereby any snapping in one component direction (e.g., horizontal) may be computed independently, followed by any snapping in the other component direction (e.g., vertical). In general, upper and lower boundaries, limits, etc. may be substituted for left and right boundaries limits, etc. (or vice-versa) in any of the above examples.

Note that the ends of the container are implicitly treated as snap points. If it is desired to have a scrollable region with some space between its first item and the beginning of the scrollable region (with which the user can interact), or space between the last item and the end, this can be typically accomplished by padding out the first/last item, or adding additional dummy items for space. However, it may not be desirable for the container to have snap scrolling all the way to the ends, or to those dummy items, or to snap at that point, as needs to be done with conventional snap points. Instead, with snap point ranges, it is simple to define ranges that include or exclude these items or endpoints to obtain the desired effect.

As mentioned above, units other than pixels may be used. For example, in a system in which UI elements render themselves, such as controls in a container control, the container knows where each contained control is to be positioned for rendering itself, and thus the item itself may be a unit corresponding to an inherent range that is either snapped or not. In other words, the range of a snap control item from its relative starting offset/position in the container to its end offset/position (its start plus offset/position its width).

Figure 10A:
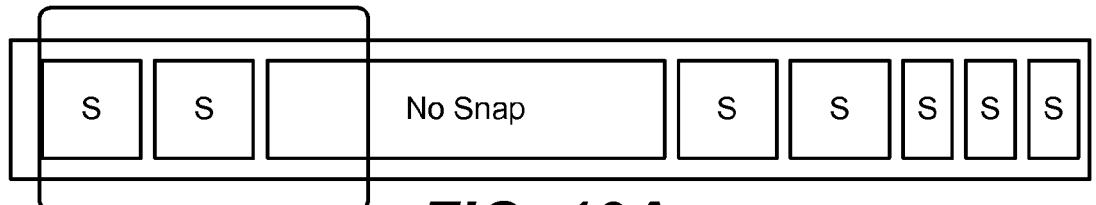
FIGS. 10A-10E are representations of how container items may be designated as snap items or no snap items, with various example scroll positions being shown as snapped if appropriate to render snap items in a viewing port, according to one or more example implementations.
Figure 10B:
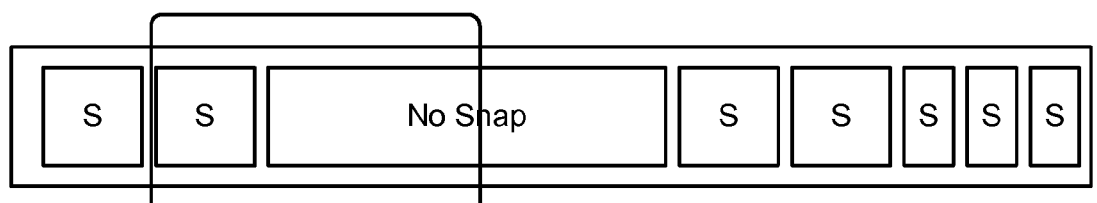
Figure 10C:
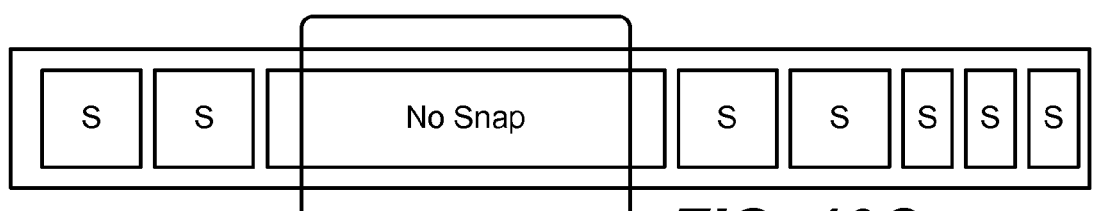
Figure 10D:
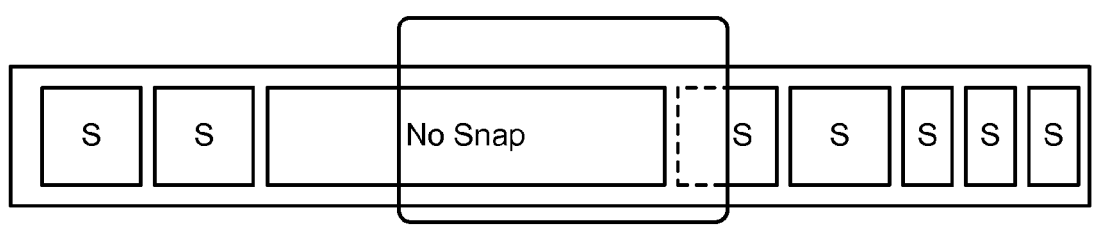
Figure 10E:
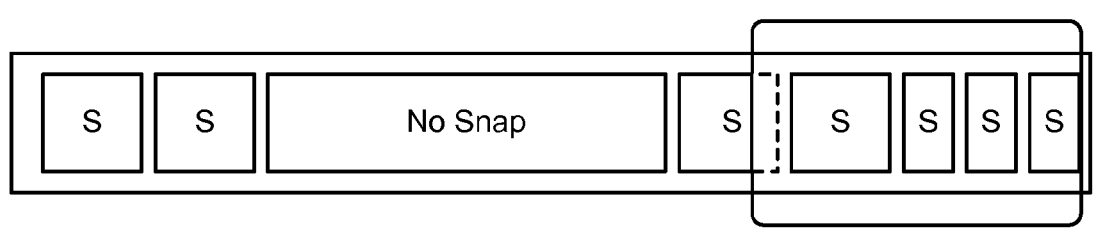

To this end, as generally represented in FIGS. 10A-10E, each control may be designed as a snap control "S" or a "No Snap" control. The container and the controls communicate with one another such that as the controls are scrolled in the viewport, no snap control S is partially rendered (FIGS. 10D and 10E). Further, snapping to a snap control, whether left snapping (FIG. 10B) or right snapping (FIG. 10E), may be determined by the viewport boundaries.

Turning to another aspect, in some interactive scenarios, scrolling can have 'weight' or 'inertia', e.g., where the user makes a touch gesture to scroll, and scrolling continues on after that gesture has ended, eventually decelerating to a stopping point. In general, a deceleration curve/computed deceleration rates may be used to bring scrolling to a smooth stop (e.g., possibly different ones for a fast scroll, a medium scroll and a slow scroll).

In these situations, snap points may be given positive or negative "gravity," so that when the gesture ends, the inertial stopping point takes into account which snap point (if any) is nearest to the desired 'final' location, and the gravity pulls or pushes the scroll so that it may end at a snap point. If no snap point is appropriate, e.g., the scroll is ending in a long non-snap item or no snap item remains in the scroll direction, then such gravity need not be used. In general, when snap point ranges are in use, the deceleration rate can be varied to smoothly end the scroll at a snap point range boundary when desired.

For example, consider that each time the user lifts a finger, inertial scrolling continues the scroll; (if the user continues scrolling, then the inertial scrolling restarts on the next finger lift). Inertial scrolling computations may be used to determine the exact stopping point based upon a deceleration rate/curve. Once determined, the stopping point can be evaluated to determine if a snap will occur at (or if desired, near) that point, and if so, then the deceleration rate can be varied to move the stopping point to coincide with the appropriate range boundary depending on the scroll and snap direction. When scrolling decelerates to a stop, the snap action is already built into the smooth deceleration, and thus no "jumpy" snap is perceived.

However, when snap point ranges are used, the deceleration rate may be adjusted to provide a more smooth scrolling experience. For example, without considering snap points in advance, the inertial scrolling will appear smooth at times but jumpy when snapping occurs at the end of the scroll. Thus, described herein is factoring in snap points into deceleration so that when a snap action occurs, the snap action appears to be part of the natural deceleration. In other words, instead of the scrolling operation sometimes causing a snap item to overlap the viewing port boundary, whereby a snap adjustment is made, inertial scrolling will sometimes cause a snap item to overlap the viewing port boundary, unless an adjustment is made to the deceleration rate to change the eventual stopping point to include the snap and thereby provide a smoother experience.

Figure 11:
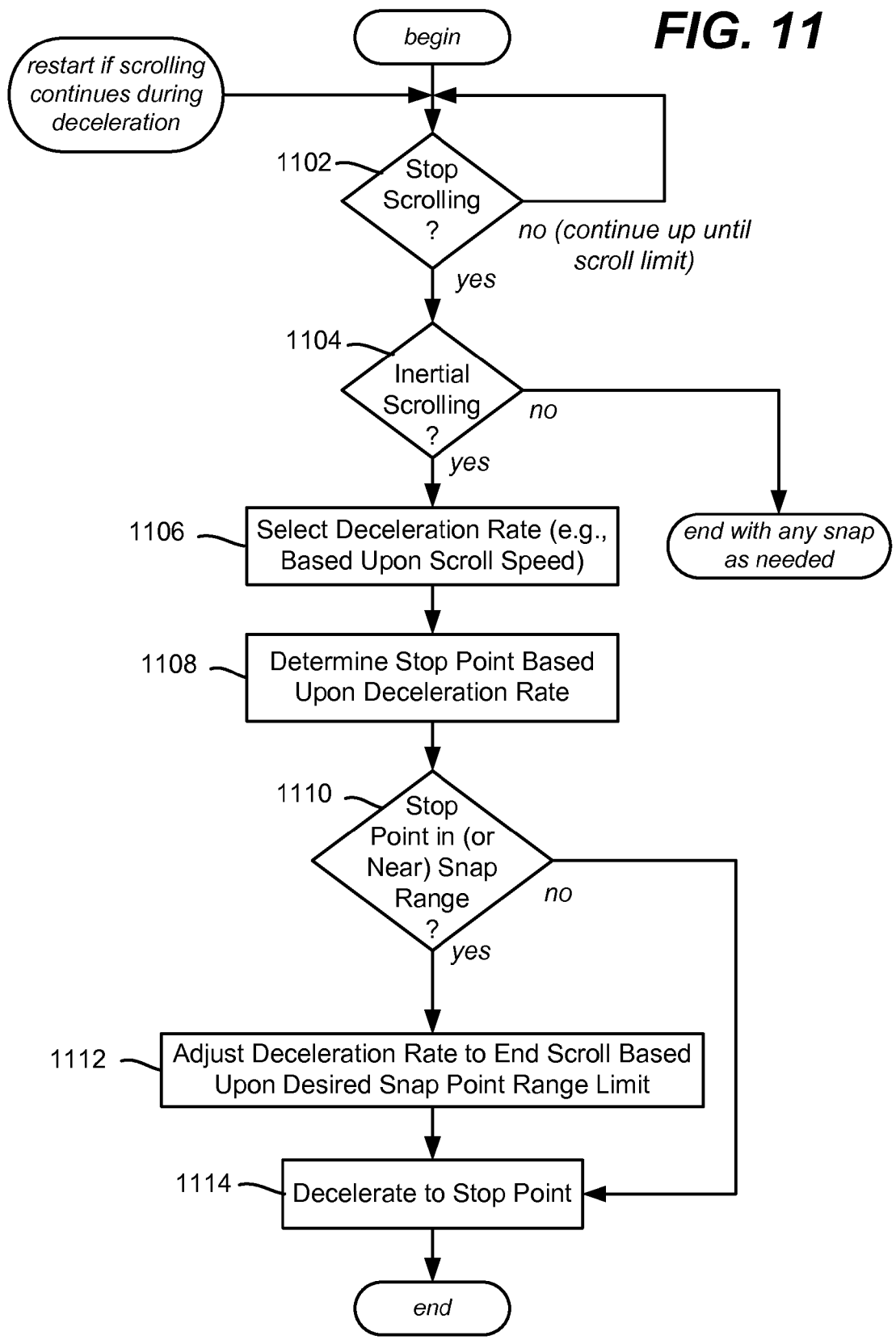
FIG. 11 is a flow diagram showing example steps that may be taken to use snap point ranges in conjunction with inertial scrolling, according to one or more example implementations.

FIG. 11 shows example logic that may be used to more naturally decelerate an inertial scrolling operation when a snap point may be involved. Step 1102 represents waiting until the scroll ends corresponding to the user lifting a finger, for example; (note that alternatively the calculations may begin when the scroll begins). If there is no inertial scrolling (step 1104), the scroll offset is known and used with any snap point adjustment, as described above.

With inertial scrolling in effect, step 1106 determines the deceleration rate, which in this example is based upon the scroll speed, e.g., was the user scrolling fast, medium or slow, (or was the user adding pressure or using any other indicator) so that the deceleration rate appears natural.

Once determined, the deceleration rate may be used at step 1108 to determine at what point (scroll offset) the inertial scrolling will decelerate to a stop. If at step 1110 this scroll offset (or the right viewing port boundary as described above) means that scrolling will end in a snap range, or sufficiently close to one, then at step 1112 the deceleration rate may be increased or decreased so that the offset (or the right viewing port boundary) will align with an item based upon an appropriate snap range limit. Step 1114 represents decelerating to a stop.

As can be seen, the technology described herein provides for snap point ranges, which allow a container to have a mix of smooth and snap items. One or more aspects include determining whether a scrolling operation has caused or will cause at least one viewing port boundary of at least two viewing port boundaries of a viewing port to correspond to a snap point range of a set of one or more snap point ranges associated with a scrollable container. If no viewing port boundary corresponds to a snap point range, one or more container items are rendered based upon at least one of the viewing port boundaries. If at least one viewing port boundary corresponds to a snap point range, at least one viewing port boundary is snapped into an adjusted viewing port boundary based upon a corresponding snap point range, and one or more container items are rendered based upon each adjusted viewing port boundary.

Note that determining whether a scrolling operation has caused or will cause at least one viewing port boundary of at least two viewing port boundaries to correspond to a snap point range may comprise computing a stopping point based upon inertial scrolling.

The scrolling operation may include a horizontal scrolling component, whereby determining whether a scrolling operation has caused or will cause (e.g., because of inertial scrolling) at least one viewing port boundary to correspond to a snap point range comprises evaluating a left viewing port boundary and/or right viewing port boundary against the set of one or more snap point ranges. The scrolling operation may include a vertical scrolling component; determining whether a scrolling operation has caused or will cause at least one viewing port boundary to correspond to a snap point range comprises evaluating an upper viewing port boundary and/or lower viewing port boundary against the set of one or more snap point ranges.

The scrolling operation may include a horizontal scrolling component and a vertical scrolling component, and the set of one or more snap point ranges may include a horizontal subset of one or more horizontal snap point ranges and a vertical subset of one or more vertical snap point ranges. Determining whether a scrolling operation has caused or will cause at least one viewing port boundary to correspond to a snap point range comprises evaluating a left viewing port boundary and/or right viewing port boundary against the horizontal subset of one or more snap point ranges and evaluating an upper viewing port boundary and/or lower viewing port boundary against the vertical subset of one or more snap point ranges. When at least one vertical viewing port boundary corresponds to a vertical snap point range and at least one horizontal viewing port boundary corresponds to a horizontal snap point range, snapping at least one viewing port boundary into an adjusted viewing port boundary comprises snapping the upper or lower viewing port boundary into an adjusted vertical viewing port boundary based upon a corresponding vertical snap point range and snapping the left or right viewing port boundary into an adjusted horizontal viewing port boundary based upon a corresponding horizontal snap point range.

Rendering the one or more container items may comprise rendering a container item that corresponds to a snap point range only if that container item fits entirely within the viewing port.

The set of one or more snap point ranges may be associated with the scrollable container by each being defined as a range of snap point values, or by each being values other than those in a range of smooth point values. The snap point range may be obtained based upon one or more item size data and corresponding one or more relative positions within the container. Item type is another way to obtain one or more snap point ranges, e.g., automatically create ranges for items that have text and/or the like and thus are to snap, and exclude items that are 'smooth' in nature, such as maps.

When at least one viewing port boundary corresponds to a snap point range, snapping at least one viewing port boundary into an adjusted viewing port boundary comprises determining whether to snap in one direction so that a container item corresponding to the snap point range is rendered in the viewing port, or to snap in an opposite direction so that the container item is not rendered in the viewing port. Determining whether to snap in one direction or to snap in an opposite direction may be based at least in part on: a scrolling direction, on an amount that the viewing port boundary overlaps the corresponding snap point range and an overlap threshold value, on a scrolling speed, and/or an amount of scroll. The overlap threshold value may be obtained from one or more values associated with the range, or by computing the overlap threshold value based upon a weight associated with the range, for example.

One or more aspects are directed towards a scrolling mechanism that scrolls an item container into a scroll position relative to a viewing port. Snapping logic that is coupled to the scrolling mechanism is configured to determine whether a container snap item spans or will span a viewing port boundary as a result of a scroll operation, and also to adjust the scroll position into an adjusted scroll position when a container snap item spans or will span a viewing port boundary. Rendering logic renders one or more container items in the viewing port based upon the scroll position if not adjusted, or based upon the adjusted scroll position if adjusted.

The snapping logic may determine whether a container snap item spans or will span a viewing port boundary based upon one or more snap point ranges associated with the item container. The scrolling mechanism, the snapping logic and the rendering logic may be incorporated into a set of one or more object-oriented programming objects. The snapping logic may determine whether a container snap item spans or will span a viewing port boundary based upon one or more item size data and corresponding one or more relative item positions within the container.

One or more aspects may be directed towards maintaining a scrollable container having a snap item set containing one or more snap items and a non-snap item set containing at least one smooth item, and determining whether scrolling to a scroll position causes or will cause a snap item to be in an overlapping state that spans a viewing boundary if rendered from the scroll position. If a snap item is in an overlapping state, the scroll position is adjusted to an adjusted scroll position to snap the snap item into a non-overlapping state, with one or more of the container items rendered based upon the adjusted scroll position. If a snap item is not in an overlapping state, one or more of the container items are rendered based upon the (e.g., non-adjusted) scroll position. Determining whether scrolling to a scroll position causes or will cause a snap item to be in an overlapping state may comprise computing the scroll position based upon inertial scrolling.

Example Computing Device

The techniques described herein can be applied to any device or set of devices capable of running programs and processes. It can be understood, therefore, that machines including but not limited to personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 12 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
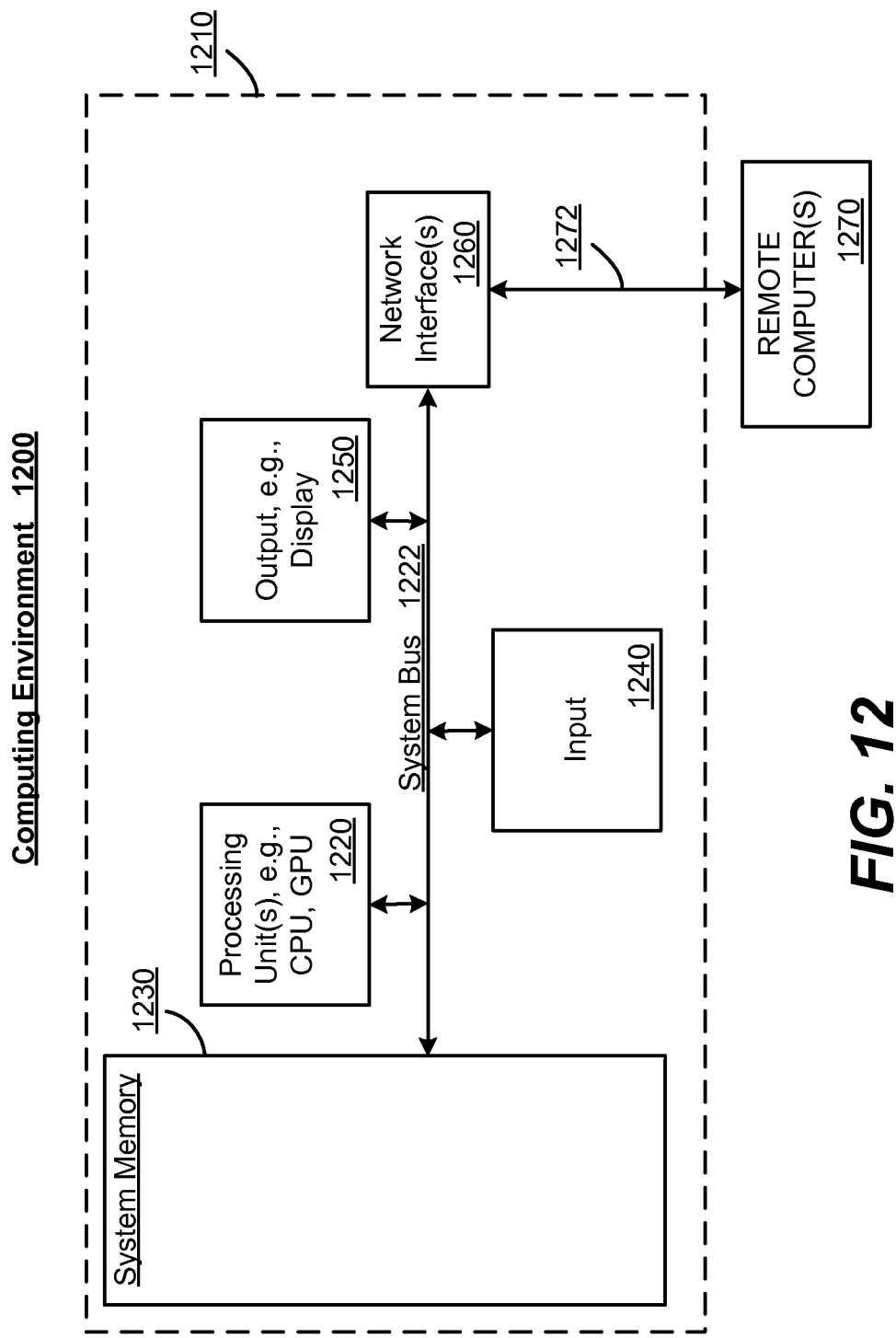
FIG. 12 is a block diagram representing an example computing environment into which aspects of the subject matter described herein may be incorporated.

FIG. 12 thus illustrates an example of a suitable computing system environment 1200 in which one or aspects of the implementations described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the example computing system environment 1200.

With reference to FIG. 12, an example device for implementing one or more implementations includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of machine (e.g., computer) readable media and can be any available media that can be accessed by a machine such as the computer 1210. The system memory 1230 may include computer storage media in the form of volatile and/or nonvolatile memory such as read only memory (ROM) and/or random access memory (RAM), and hard drive media, optical storage media, flash media, and so forth. By way of example, and not limitation, system memory 1230 may also include an operating system, application programs, other program modules, and program data.

A user can enter commands and information into the computer 1210 through one or more input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising,
determining, by a display system comprising a processor, a set of content items in a scrollable container, wherein the set of content items comprise at least one discrete content item and at least one continuous content item, wherein continuous content items can be partially rendered in the scrollable container and do not have associated snap point ranges, and discrete content items cannot be partially rendered in the scrollable container and have associated snap point ranges;
determining, by the display system, respective snap point ranges for the at least one discrete content item;
in response to determining that the scrolling operation has not caused and will not cause at least one viewing port boundary of the at least two viewing port boundaries of a viewing port to correspond to any of the snap point ranges, rendering, by the display system, at least one content item of the set of content items based upon at least one of the viewing port boundaries; and
in response to determining that the scrolling operation has caused or will cause a viewing port boundary of the at least two viewing port boundaries to correspond to a snap point range of the snap point ranges, snapping, by the display system, the viewing port boundary into an adjusted viewing port boundary corresponding to the snap point range, and rendering, by the display system, the at least one content item based upon the adjusted viewing port boundary.

2. The method of claim 1, wherein the scrolling operation includes a horizontal scrolling operation, and further comprising determining whether the scrolling operation has caused or will cause the at least one viewing port boundary to correspond to any snap point range of the snap point ranges, comprising evaluating at least one of a left viewing port boundary or right viewing port boundary of the at least two viewing port boundaries against the snap point ranges.

3. The method of claim 1, wherein the scrolling operation includes a vertical scrolling operation, and further comprising determining whether the scrolling operation has caused or will cause the at least one viewing port boundary to correspond to any snap point range of the snap point ranges, comprising evaluating at least one of an upper viewing port boundary or lower viewing port boundary of the at least two viewing port boundaries against the snap point ranges.

4. The method of claim 1, wherein the scrolling operation includes a horizontal scrolling operation and a vertical scrolling operation, wherein the snap point ranges includes a horizontal subset of one or more horizontal snap point ranges and a vertical subset of one or more vertical snap point ranges, and further comprising determining whether the scrolling operation has caused or will cause the at least one viewing port boundary to correspond to any snap point range of the snap point ranges, comprising evaluating at least one of a left viewing port boundary or right viewing port boundary of the at least two viewing port boundaries against the horizontal subset of one or more horizontal snap point ranges, and evaluating at least one of an upper viewing port boundary or lower viewing port boundary of the at least two viewing port boundaries against the vertical subset of one or more vertical snap point ranges.

5. The method of claim 4, wherein the at least one of the upper viewing port boundary or the lower viewing port boundary corresponds to a vertical snap point range of the vertical subset, and wherein the at least one of the left viewing port boundary or the right viewing port boundary viewing port boundary corresponds to a horizontal snap point range of the horizontal subset, and wherein snapping the viewing port boundary into the adjusted viewing port boundary comprises snapping the upper viewing port boundary or the lower viewing port boundary into an adjusted vertical viewing port boundary based upon a corresponding vertical snap point range and snapping the left viewing port boundary or the right viewing port boundary into an adjusted horizontal viewing port boundary based upon a corresponding horizontal snap point range.

6. The method of claim 1, further comprising determining whether the scrolling operation has caused or will cause the at least one viewing port boundary to correspond to any snap point range of the snap point ranges, comprising computing a stopping point based upon inertial scrolling.

7. The method of claim 1, wherein rendering the at least one content item comprises rendering a content item that corresponds to a snap point range only if that content item fits entirely within the viewing port.

8. The method of claim 1, wherein the snap point ranges are associated with the scrollable container by each being defined as a range of snap point values, or by each being values other than those in a range of smooth point values.

9. The method of claim 1, wherein the viewing port boundary corresponds to the snap point range, and wherein snapping the viewing port boundary into the adjusted viewing port boundary comprises determining whether to snap in a first direction so that a content item corresponding to the snap point range is rendered in the viewing port, or to snap in a second direction that is opposite the first direction so that the content item is not rendered in the viewing port.

10. The method of claim 9, wherein determining whether to snap in the first direction or to snap in the second direction is based at least in part on a scrolling direction.

11. The method of claim 9, wherein determining whether to snap in the first direction or to snap in the second direction is based at least in part on an amount that the viewing port boundary overlaps the corresponding snap point range and an overlap threshold value.

12. The method of claim 11, further comprising obtaining the overlap threshold value from one or more values associated with the corresponding snap point range, or computing the overlap threshold value based upon a weight associated with the corresponding snap point range.

13. The method of claim 9, wherein determining whether to snap in the first direction or to snap in the second direction is based at least in part on at least one of a scrolling speed or an amount of scroll.

14. The method of claim 1, wherein determining the snap point range for a discrete content item of the at least one discrete content item is based upon at least one of item size data and relative position of the discrete content item within the container, or an item type of the discrete content item.

15. A display system comprising:
a processor; and
a memory communicatively coupled to the processor, the memory having stored therein computer-executable components, comprising:
a scrolling mechanism component that scrolls an item container into a scroll position relative to a viewing port;
snapping logic component that:
determine a set of content items in the item container, wherein the set of content items comprise at least one discrete content item and at least one continuous content item, wherein continuous content items can be partially rendered in the item container and do not have associated snap point ranges, and discrete content items cannot be partially rendered in the item container and have associated snap point ranges;
determine respective snap point ranges for the at least one discrete content item;
in response to a determination that a discrete content item of the at least one discrete content item spans or will span a viewing port boundary as a result of a scroll operation, adjust the scroll position into an adjusted scroll position; and
rendering logic component that renders one or more content items of the set of content items in the viewing port based upon the scroll position in response to the determination that the discrete content item spans or will span the viewing port boundary as the result of the scroll operation, or based upon the adjusted scroll position in response to a determination that the discrete content item does not span and will not span the viewing port boundary as the result of the scroll operation.

16. The system of claim 15, wherein the snapping logic component determines whether the discrete content item spans or will span the viewing port boundary based upon the respective snap point ranges associated with the at least one discrete content item.

17. The system of claim 15, wherein the scrolling mechanism component, the snapping logic component, and the rendering logic component are incorporated into a set of one or more object-oriented programming objects.

18. The system of claim 15, wherein the scrolling operation includes a horizontal scrolling operation and a vertical scrolling operation, wherein the snap point ranges includes a horizontal subset of one or more horizontal snap point ranges and a vertical subset of one or more vertical snap point ranges, and the snapping logic component determines whether the discrete content item spans or will span the viewing port boundary based upon evaluating at least one of a left viewing port boundary or right viewing port boundary of the at least two viewing port boundaries against the horizontal subset of one or more horizontal snap point ranges, and evaluating at least one of an upper viewing port boundary or lower viewing port boundary of the at least two viewing port boundaries against the vertical subset of one or more vertical snap point ranges.

19. A non-transitory computer-readable medium having instructions stored thereon that, in response to execution, cause a display system including a processor to perform operation comprising:
maintaining a scrollable container having a set of content items, wherein the set of content items comprises at least one discrete content item and at least one continuous content item, wherein continuous content items can be partially rendered in the scrollable container and do not have associated snap point ranges, and discrete content items cannot be partially rendered in the scrollable container and have associated snap point ranges;
determining respective snap point ranges for the at least one discrete content item;
in response to determining that a scrolling operation has not caused and will not cause at least one viewing port boundary of the at least two viewing port boundaries of a viewing port to correspond to any of the snap point ranges, rendering, by the display system, at least one content item of the set of content items based upon at least one of the viewing port boundaries; and
in response to determining that the scrolling operation has caused or will cause a viewing port boundary of the at least two viewing port boundaries to correspond to a snap point range of the snap point ranges, snapping, by the display system, the viewing port boundary into an adjusted viewing port boundary corresponding to the snap point range, and rendering, by the display system, the at least one content item based upon the adjusted viewing port boundary.

20. The non-transitory computer-readable medium of claim 19, further comprising determining whether the scrolling operation has not caused and will not cause the at least one viewing port boundary of the at least two viewing port boundaries of the viewing port to correspond to any of the snap point ranges, comprising computing a scroll position of the scrolling operation based upon inertial scrolling.

* * * * *